US011353475B2

(12) United States Patent
Xie et al.

(10) Patent No.: US 11,353,475 B2
(45) Date of Patent: Jun. 7, 2022

(54) DETECTING DEVICE FOR DETECTING ROTATION SPEED OF COLOR WHEEL, LIGHT SOURCE SYSTEM AND PROJECTION DEVICE

(71) Applicant: Appotronics Corporation Limited, Shenzhen (CN)

(72) Inventors: Songting Xie, Shenzhen (CN); Zaixiang Xiong, Shenzhen (CN); Guobo Hou, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 17/272,093

(22) PCT Filed: Mar. 1, 2019

(86) PCT No.: PCT/CN2019/076638
§ 371 (c)(1),
(2) Date: Feb. 26, 2021

(87) PCT Pub. No.: WO2020/042567
PCT Pub. Date: Mar. 5, 2020

(65) Prior Publication Data
US 2021/0325418 A1 Oct. 21, 2021

(30) Foreign Application Priority Data

Aug. 31, 2018 (CN) .......................... 201811014356.5

(51) Int. Cl.
*G01P 3/36* (2006.01)
*G02B 26/00* (2006.01)
(Continued)

(52) U.S. Cl.
CPC ................ *G01P 3/36* (2013.01); *G01K 3/005* (2013.01); *G01K 7/22* (2013.01); *G02B 26/008* (2013.01); *G03B 21/204* (2013.01)

(58) Field of Classification Search
CPC .. G02B 7/006; G02B 26/008; G02B 23/2461; G02B 26/007; G02B 26/023;
(Continued)

(56) References Cited

U.S. PATENT DOCUMENTS 5,245,179 A * 9/1993 Chang .................. G02B 26/008
356/418
2001/0030999 A1 10/2001 Moizio et al.
(Continued)

FOREIGN PATENT DOCUMENTS

CN 101750855 A 6/2010
CN 103235470 A 8/2013
(Continued)

OTHER PUBLICATIONS

Chinese Office Action dated Feb. 5, 2021, Application No. 201811014356.5.
(Continued)

*Primary Examiner* — William J Carter
(74) *Attorney, Agent, or Firm* — The Dobrusin Law Firm, PC (57) ABSTRACT

A detecting device for detecting a rotation speed of the color wheel includes: a first processing unit, used to compare an external ambient temperature with a preset temperature, and outputs a logic level when the external ambient temperature is greater than the preset temperature; and a light-emitting unit, including a light-emitting body for emitting measurement light, a temperature compensation circuit, wherein the temperature compensation circuit adjusts, according to the logic level and the external ambient temperature, the resistance of a circuit in which the light-emitting body is located, causing a driving current of the light-emitting body to be within a preset current range, a reflection unit disposed on a moving color wheel and used to reflect measurement light, and a measurement and control unit used to receive the measurement light emitted periodically by the reflection unit, and to calculate the number of times that the measurement light enters.

20 Claims, 7 Drawing Sheets

(51) Int. Cl.
  *G03B 21/20* (2006.01)
  *G01K 3/00* (2006.01)
  *G01K 7/22* (2006.01)
(58) Field of Classification Search
  CPC . G02B 26/10; G02B 5/20; G01P 3/489; G01J 3/51; G01J 3/50; G03B 21/20
  See application file for complete search history.

(56) References Cited

U.S. PATENT DOCUMENTS

| | | | | |
|---|---|---|---|---|
| 2002/0003704 | A1* | 1/2002 | Ohmae | F21S 10/007 348/E5.143 |
| 2005/0146767 | A1* | 7/2005 | Richards | G02B 26/008 359/238 |
| 2006/0126030 | A1 | 6/2006 | Jin | |
| 2009/0052185 | A1* | 2/2009 | Toriyama | G02B 26/007 362/293 |
| 2015/0241764 | A1* | 8/2015 | Hung | G03B 21/2053 353/121 |
| 2016/0316183 | A1* | 10/2016 | Cui | H04N 9/3158 |
| 2018/0051865 | A1* | 2/2018 | Cui | G03B 33/08 |

FOREIGN PATENT DOCUMENTS

| | | |
|---|---|---|
| CN | 204178109 U | 2/2015 |
| CN | 105759549 A | 7/2016 |
| CN | 106124792 A | 11/2016 |
| CN | 106468719 A | 3/2017 |
| CN | 206541947 U | 9/2017 |
| CN | 108073026 A | 5/2018 |

OTHER PUBLICATIONS

International Search Report dated May 29, 2019, Application No. PCT/CN2019/076638.

* cited by examiner

DETECTING DEVICE FOR DETECTING ROTATION SPEED OF COLOR WHEEL, LIGHT SOURCE SYSTEM AND PROJECTION DEVICE

TECHNICAL FIELD

The present disclosure relates to the field of projection technology and, in particular, to a detecting device for detecting a rotation speed of a color wheel, a light source system and a projection device.

BACKGROUND

This section is intended to provide background or context for embodiments of the present disclosure stated in the claims. The description here is not recognized as prior art just because it is included in this section.

At present, a laser projector will be equipped with a color wheel rotational speed detector behind a color wheel, to measure a rotational speed of the color wheel and feed it back to a processor in time in a form of a frequency, and a main chip sends, according to a measured rotational speed value of the color wheel, a control signal for turning on or off the excitation light source to a power supply VCC constant current board, thereby controlling output of a driving voltage of a driving circuit.

However, in actual operations of a product, a certain error will occur in measurement of the color wheel rotational speed detector, thereby affecting control of a laser current by the main chip. One of important reasons that affect the rotational speed of the color wheel is that poor heat dissipation inside the product causes a temperature around the color wheel rotational speed measurement chip to rise, which affects reading of the color wheel rotational speed value and ultimately affects controlling of the main chip to the power supply VCC constant current board.

SUMMARY

In order to solve a technical problem of low accuracy of the measured color wheel rotational speed caused by temperature rise in the prior art, the present disclosure provides a detecting device for detecting a rotation speed of a color wheel that can effectively reduce influence of the accuracy of the temperature rise on the measured color wheel rotational speed, and the present disclosure also provides a light source system and a projection device.

A detecting device for detecting a rotation speed of a color wheel includes:

a first processing unit configured to compare an external ambient temperature with a preset temperature and to output a logic level when the external ambient temperature is higher than the preset temperature;

a light-emitting unit including a light emitting body and a temperature compensation circuit, where the light emitting body is configured to emit detection light, the temperature compensation circuit comprises an input terminal electrically connected to the first processing unit and a first terminal electrically connected to the light emitting body, and the temperature compensation circuit adjusts resistance of a wiring where the light emitting body is located based on the logic level and the external ambient temperature in such a manner that a driving current of the light emitting body is within a preset current range;

a reflection unit configured to reflect the detection light and arranged on a color wheel that is movable, where the reflection unit periodically comes into an optical path of the detection light under driving of the color wheel; and a detecting and control unit configured to receive the detection light periodically exiting from the reflection unit and calculate a number of incidence times of the detection light so as to determine a rotational speed of the color wheel.

Further, the temperature compensation circuit further includes:

a second terminal, resistance between the second terminal and reference ground being a fixed value; and a third terminal, resistance between the third terminal and the reference ground changing with the external ambient temperature;

if the first processing unit does not output the logic level, the first terminal is electrically connected to the second terminal, and if the first processing unit outputs the logic level, the first terminal is electrically connected to the third terminal.

Further, when the external ambient temperature is lower than the preset temperature, the preset current range is a first current range;

when the external ambient temperature is higher than the preset temperature, the preset current range is a second current range different from the first current range.

Further, the temperature compensation circuit further includes:

a current limiting resistor electrically connected between the second terminal and the reference ground; and a thermistor electrically connected between the third terminal and the reference ground.

Further, resistance of the light emitting body increases as the external ambient temperature increases, and the thermistor is a thermistor with a negative temperature coefficient.

Further, the temperature compensation circuit further includes:

a relay including a static contact and two movable contacts, where the first terminal is the static contact of the relay, and the second terminal and the third terminal are the two movable contacts, respectively;

a switching circuit comprising an output terminal and the input terminal, wherein the output terminal is electrically connected to a coil of the relay, when the first processing unit outputs the logic level, the switching circuit is turned on and a current flows through a wiring where the output terminal and the coil are located.

Further, the switching circuit further includes a voltage-regulator diode connected in parallel to two terminals of the relay.

Further, the switching circuit includes a triode, a base of the triode is electrically connected to the input terminal, and a collector or emitter of the triode is the output terminal.

Further, the switching circuit includes a photocoupler, the photocoupler includes an inverter, a light-emitting diode, and a photosensitive triode, the inverter is connected between the first processing unit and the input terminal, an electrode of the light-emitting diode is electrically connected to the input terminal, and an electrode of the photosensitive triode is the output terminal.

Further, the reflection unit is a mirror, or a reflecting film or a reflecting surface provided on a surface of the color wheel.

Further, the detecting device further includes a temperature sensing device configured to sense the external ambient temperature and transmit a temperature signal corresponding to the external ambient temperature to the first processing unit.

Further, the detecting and control unit includes:

a photosensitive triode configured to convert the periodically received detection light into an electrical pulse signal;

a comparator circuit electrically connected to the photosensitive triode and configured to compare the electrical pulse signal with a preset voltage value and output a comparison result; and a second processing unit configured to count a number of the electrical pulse based on the comparison result.

Further, a light source system includes:

an excitation light source configured to emit excitation light;

a color wheel configured to generate fluorescence of at least one color under irradiation of the excitation light;

a light source driving circuit electrically connected to the excitation light source; and the detecting device for detecting the rotation speed of the color wheel as described above;

the detecting and control unit is configured to output a control signal to the light source driving circuit according to the rotational speed of the color wheel, and the light source driving circuit provides a driving current to the excitation light source according to the control signal.

A projection device includes the light source system as described above.

The temperature compensation circuit of the detecting device provided by the present disclosure dynamically adjusts the resistance of the wiring where the light emitting body is located according to the external ambient temperature, so that the driving current of the light emitting body is within the preset current range, and measurement accuracy of the detecting device does not decrease as the external ambient temperature changes.

BRIEF DESCRIPTION OF DRAWINGS

In order to more clearly illustrate the technical solutions in the embodiments/implementing manners of the present disclosure, the accompanying drawings used in the embodiments/implementing manners are briefly described below. Obviously, the drawings described below are merely some embodiments/implementing manners of the present disclosure. Based on these drawings, those of ordinary skill in the art can obtain other drawings without any creative effort.

| Description of main component symbols | |
|---|---|
| Light source system | 10 |
| Excitation light source | 101 |
| Light source driving circuit | 102 |
| Color wheel | 103 |
| Detecting device for detecting a rotation speed of a color wheel | 200, 300 |
| Light-emitting unit | 201 |
| Light emitting body | 210 |
| Temperature compensation circuit | 230, 330 |
| First terminal | 231 |
| Second terminal | 232 |
| Third terminal | 233 |
| Relay | 234, 334 |
| Switching circuit | 235, 325 |
| Input terminal | 236, 336 |
| Output terminal | 237, 337 |
| First processing unit | 203, 303 |
| Reflection unit | 205 |
| Detecting and control unit | 207 |
| Photosensitive triode | Q |
| Collector | B |
| Non-inverting input terminal | C |
| Output terminal | D |
| Comparator circuit | 273 |
| Second processing unit | 275 |
| Power supply | VCC, VCC2 |

The following embodiments will further illustrate the present disclosure in conjunction with the above drawings.

DESCRIPTION OF EMBODIMENTS

To understand the above objectives, features and advantages of the present disclosure more clearly, the present disclosure will be described in detail below with reference to the accompanying drawings and specific embodiments. It should be noted that the embodiments of the present disclosure and the features in the embodiments can be combined with each other if there is no conflict.

In the following description, many specific details are explained to fully understand the present disclosure, and the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

Unless otherwise defined, all technical and scientific terms used herein have the same meaning as commonly understood by those skilled in the technical field of the present disclosure. The terms used in the specification of the present disclosure herein are only for the purpose of describing specific embodiments and are not intended to limit the present disclosure.

An embodiment of the present disclosure provides a detecting device for detecting a rotation speed of a color wheel configured to measure a rotational speed of a color wheel of a light source system, the light source system can be applied to a projection device, and the projection device can include one optical-mechanical system such as a liquid crystal display (LCD), a liquid crystal on Silicon (LCOS), or a digital mirror device (DMD).

Figure 1:
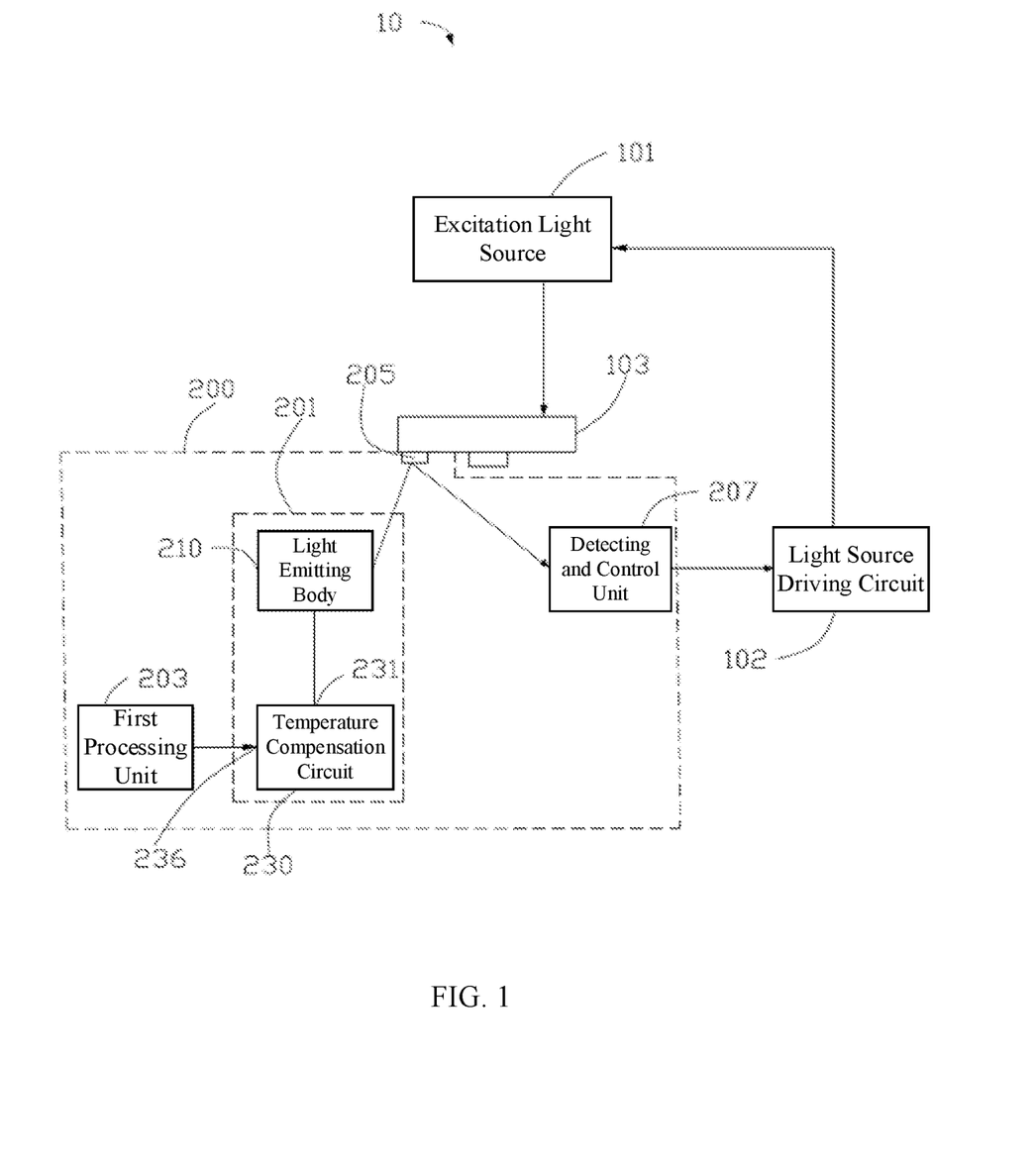
FIG. 1 is a schematic block diagram of a light source system provided by an embodiment of the present disclosure.

Referring to FIG. 1, which is a schematic block diagram of a light source system 10 according to an embodiment of the present disclosure. The light source system 10 includes an excitation light source 101, a light source driving circuit 102, a color wheel 103, and a detecting device 200 for detecting a rotation speed of a color wheel. The excitation light source 101 is electrically connected to the light source driving circuit 102, and the light source driving circuit 102 is electrically connected to the detecting device 200. The color wheel 103 moves periodically under driving of a driving device, the detecting device 200 outputs a control signal to the light source driving circuit 102 according to a rotational speed of the color wheel 103, the light source driving circuit 102 provides a driving current to the excitation light source 101 according to the control signal, the excitation light source 101 is configured to emit excitation light under the driving of the light source driving circuit 102, and the color wheel 103 generates fluorescence of at least one color under excitation of the excitation light.

In this embodiment, the excitation light source 101 is a blue light source configured to emit blue excitation light. It can be understood that the excitation light source 101 is not limited to the blue light source, and the excitation light source 101 can also be a red light source, a green light source or an ultraviolet light source. A blue laser is provided in the excitation light source 101 and configured to emit the blue excitation light. In other embodiments, the blue laser in the excitation light source 101 can also be replaced with a blue light-emitting diode. One or two blue lasers or a blue laser array can be provided in the excitation light source 101, and it can be understood that the number of lasers can be flexibly set as required. The excitation light source 101 can also be provided with a light-homogenizing device for homogenizing the laser, and the light-homogenizing device can be a light-homogenizing rod or a fly-eye lens. In an embodiment, a scattering film for decoherence can be provided on the light-homogenizing device. Light emitted from the light-homogenizing device is used to irradiate the color wheel 103.

The color wheel 103 includes a substrate and a driving device arranged on the substrate. In this embodiment, the substrate is circular, a surface of the substrate is provided with a plurality of color zones, the color zones are provided with different wavelength conversion materials (such as phosphors or quantum dots, etc.), the wavelength conversion material is used to receive the excitation light and convert the excitation light into fluorescence of at least one color (or wavelength range) in other wavelength ranges for emission. In this embodiment, the surface of the substrate is provided with three color zones, namely a blue zone, a red zone and a green zone. The blue zone is provided with a scattering material for scattering the excitation light and then emitting it, so as to change a divergence angle of the excitation light and perform decoherence processing on the excitation light. The red zone and the green zone are respectively provided with red and green phosphors, to convert blue excitation light into red fluorescence and green fluorescence for emission. In an embodiment, the surface of the substrate of the color wheel 103 is provided with a blue zone and a yellow zone, the blue zone is used to scatter the excitation light, the yellow zone is used to convert the excitation light into yellow fluorescence, and it can be understood that the surface of the color wheel 103 can also be provided with various zones of other colors, which is not limited thereto. In an embodiment, the surface of the color wheel 103 is provided with a first red zone, a second red zone, a green zone and a blue zone, the blue zone is used to scatter the excitation light, the green zone is used to convert the excitation light into green fluorescence, the first red zone and the second red zone are used to respectively convert the excitation light into broad-spectrum red fluorescence and narrow-spectrum red fluorescence, and a color gamut range of the light emitted by the light source system 10 is dynamically adjusted by adjusting proportions of the broad-spectrum red fluorescence and the narrow-spectrum red fluorescence.

In an embodiment, a filter unit is further provided on the substrate and configured to filter light emitted from different color zones of the color wheel 103. Preferably, the filter unit is arranged at an edge of the substrate or on a bottom surface of the substrate.

The driving device is arranged at a geometric center of the bottom surface of the substrate and configured to drive the substrate to rotate periodically, the different color zones on the substrate are periodically located on an optical path of the excitation light, and the color wheel 103 emits three primary color light sequentially. In an embodiment, the substrate of the color wheel 103 is strip-shaped, the driving device is arranged at an end of the strip-shaped substrate, and the driving device drives the substrate to reciprocate periodically.

In this embodiment, the light source driving circuit 102 is electrically connected to the excitation light source 101 and configured to provide a driving current to the excitation light source 101. The excitation light source 101 emits the excitation light according to the driving current, and an optical power of the excitation light increases as the driving current increases. In an embodiment, the light source driving circuit 102 is electrically connected to the excitation light source 101 and the driving device of the color wheel 103 and configured to provide the driving current to the excitation light source 101 and provide a current to drive the color wheel 103 to operate. The light source driving circuit 102 dynamically changes the driving current according to the rotational speed of the color wheel 103, to adjust energy conversion efficiencies of the wavelength conversion materials in respective color zones. Specifically, as the color wheel 103 rotates periodically, the respective color zones on the color wheel 103 sequentially receives the excitation light, while the light source driving circuit 102 changes the driving current according to the respective color zones receiving the excitation light.

As shown in FIG. 1, the detecting device 200 includes a light-emitting unit 201 configured to emit detection light, a first processing unit 203 electrically connected to the light-emitting unit 201, a reflection unit 205 arranged on the color wheel 103 and configured to reflect the detection light emitted by the light-emitting unit 201, and a detecting and control unit 207. The detecting and control unit 207 is configure to receive the detection light periodically exiting from the reflection unit 205 and calculate the number of incidence times of the detection light.

Specifically, the light-emitting unit 201 includes a light emitting body 210 and a temperature compensation circuit 230 electrically connected to the light emitting body 210. The light emitting body 210 is configured to emit detection light. The light emitting body 210 can include a laser or a light-emitting diode, in the embodiment of the present disclosure, the light emitting body 210 is a light-emitting diode, and internal resistance of the light emitting body 210 varies with temperature.

Figure 2:
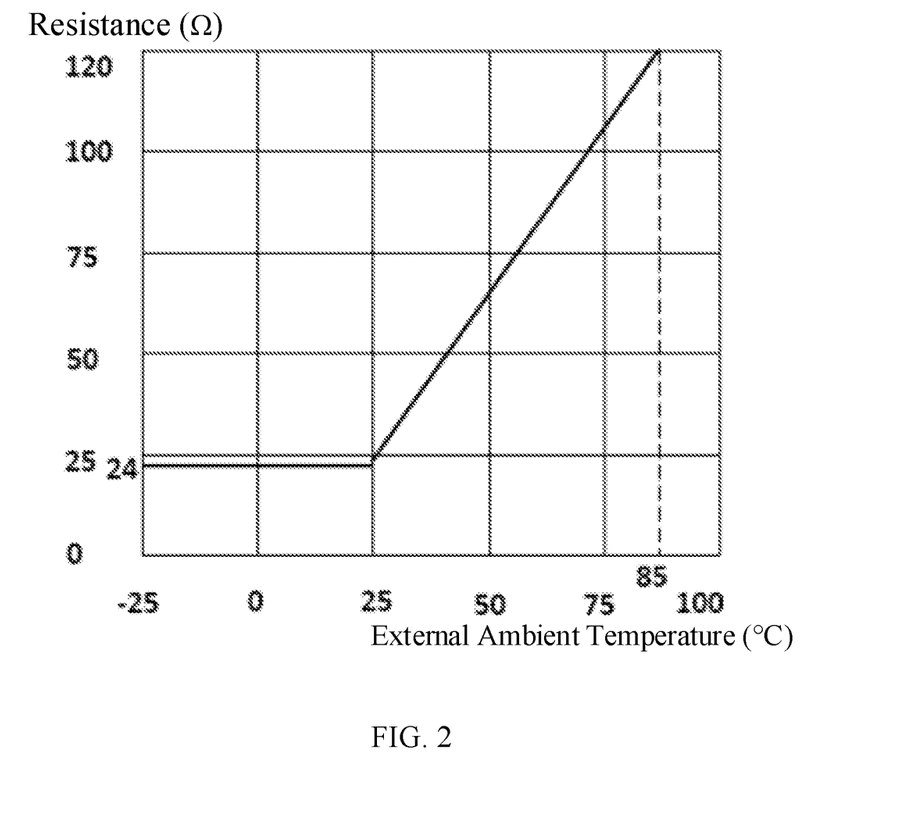
FIG. 2 shows a variation curve of internal resistance of a light emitting body with an external ambient temperature.
Figure 3:
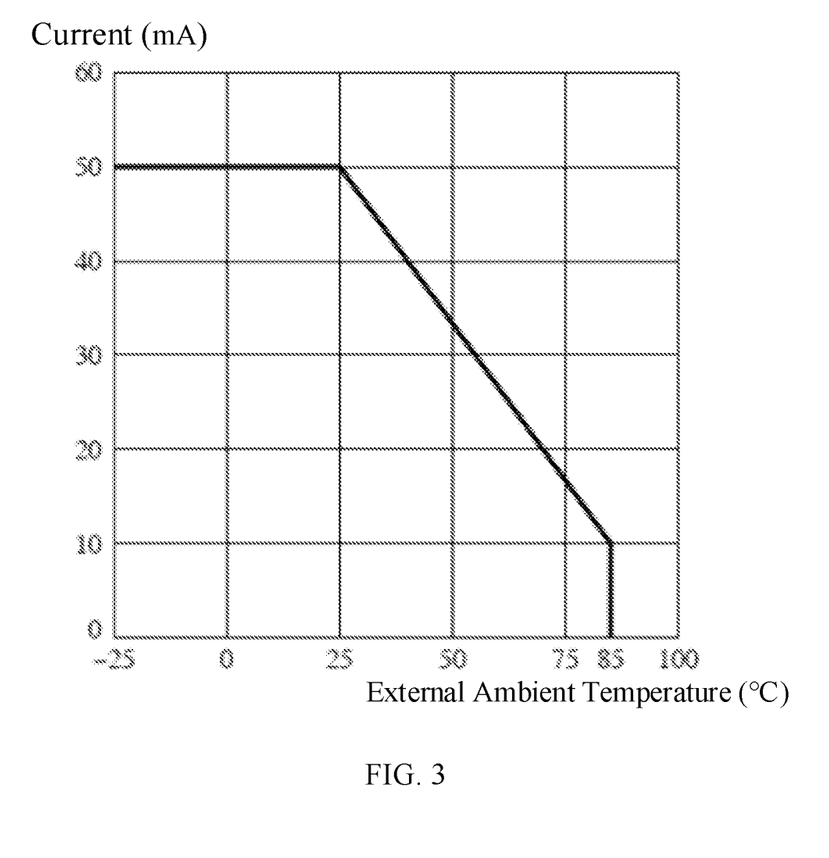
FIG. 3 shows a variation curve of a driving current of a light emitting body with an external environmental temperature in a condition where the light emitting body is grounded through a fixed resistance device.

Referring to FIG. 2 and FIG. 3 in conjunction with FIG. 1, FIG. 2 is a variation curve of the internal resistance of the light emitting body 210 with an external ambient temperature, and FIG. 3 shows the variation curve of the driving current of the light emitting body 210 with the external ambient temperature when the light emitting body 210 is grounded through a fixed resistance device. In the embodiment of the present disclosure, the light emitting body 210 can work normally when the external ambient temperature is in a range of −25° C. to 85° C. It can be seen from FIG. 2 that the curve of the internal resistance of the light emitting body 210 turns at 25° C., and in the embodiment of the present disclosure, a preset temperature is set to 25° C. based on the light emitting body 210. It can be understood that when a different light emitting body 210 is used, the preset temperature can change accordingly. As shown in FIGS. 2 and 3, the internal resistance of the light emitting body 210 does not change with temperature in an environment of a temperature range of −25° C. to 25° C., and it is a constant of 24Ω, 24Ω is only the internal resistance of one type of the light emitting body 210, and when a different light emitting body 210 is used, the resistance can be different. The driving current remains 50 mA; when the external ambient temperature is in a range of 25° C. to 85° C., the range of the internal resistance of the light emitting body 210 is with a range of 240 to 1200. As the temperature of the external environment gradually increases, the internal resistance of the light emitting body 210 gradually increases, the driving current of the light emitting body 210 gradually decreases, and luminous brightness of the light emitting body 210 gradually decreases. Since relatively low luminous brightness of the light emitting body 210 will result in that the detection light emitted by the reflection unit 205 cannot be detected by the detecting and control unit 207, thereby affecting measurement accuracy of the detecting device 200.

As shown in FIG. 1, in order to prevent the luminous brightness of the light emitting body 210 from decreasing as the temperature increases to affect the measurement accuracy of the detecting device 200, in the embodiment of the present disclosure, the first processing unit 203 is configured to compare the external ambient temperature with the preset temperature, when the external ambient temperature is higher than the preset temperature, the first processing unit 203 outputs a logic level. In an embodiment of the present disclosure, the logic level is a high level. The temperature compensation circuit 230 electrically connected to the light emitting body 210 includes a first terminal 231 and an input terminal 236. The input terminal 236 is electrically connected to the first processing unit 203 and configured to receive an output signal of the first processing unit 203. The first terminal 231 is electrically connect with the light emitting body 210. The temperature compensation circuit 230 is configured to dynamically adjust, according to the output signal of the first processing unit 203, the resistance of the wiring where the light emitting body 210 is located, so that the driving current of the light emitting body 210 is within a preset current range, to further ensure that the luminous brightness of the light emitting body 210 can always be detected by the detecting and control unit 207 after being reflected by the reflection unit 205.

Figure 4:
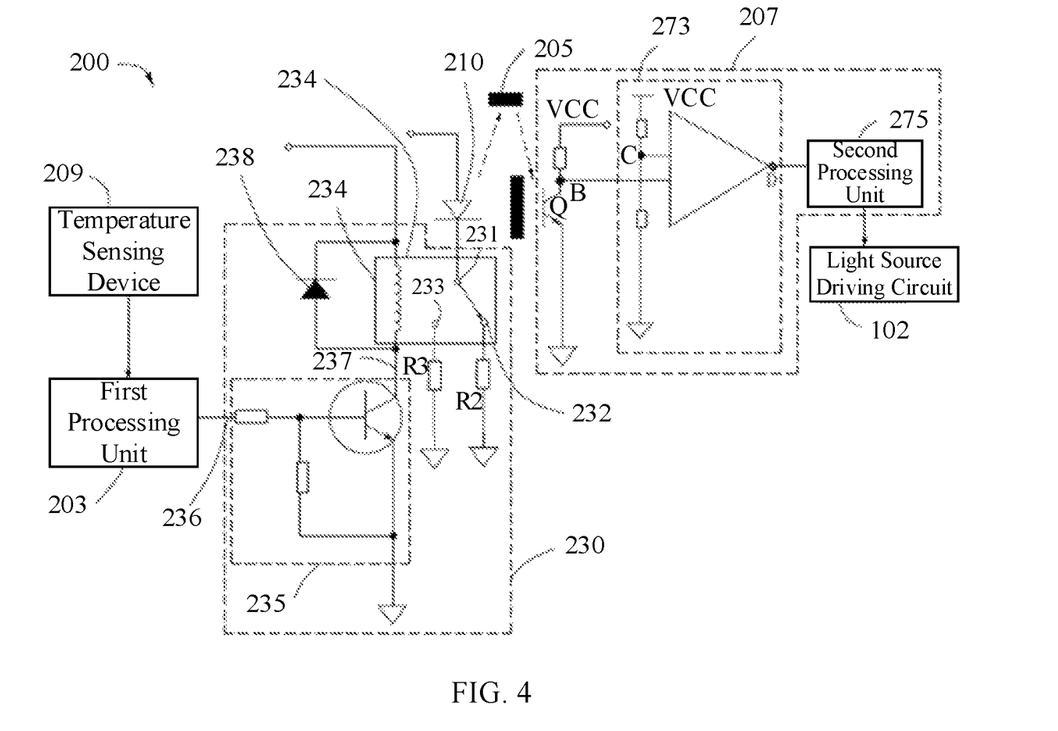
FIG. 4 is a circuit diagram of a detecting device for detecting a rotation speed of a color wheel shown in FIG. 1 according to a first embodiment.

Specifically, referring to FIG. 4, which is a circuit diagram of the detecting device 200 shown in FIG. 1 according to a first embodiment. The temperature compensation circuit 230 further includes a second terminal 232 and a third terminal 233. Resistance between the second terminal 232 and reference ground is a fixed value, and a current limiting resistor R2 is provided between the second terminal 232 and the reference ground. Resistance between the third terminal 233 and the reference ground changes with the external ambient temperature, and a thermistor R3 is provided between the third terminal 233 and the reference ground. In this embodiment, since the internal resistance of the light emitting body 210 increases linearly with the increase in temperature, the thermistor R3 is a thermistor with a negative temperature coefficient in order to perform temperature compensation on the resistance of the light emitting body 210.

If the external ambient temperature is lower than 25° C., the first processing unit 203 does not output the logic level, the first terminal 231 is electrically connected to the second terminal 232, and the light emitting body 210 is grounded through the current limiting resistor R2; if the external ambient temperature is higher than 25° C., the first processing unit 203 outputs the logic level, the first terminal 231 is electrically connected to the third terminal 233, the light emitting body 210 is grounded through the thermistor R3, and the thermistor R3 automatically adjusts its resistance according to the external ambient temperature, so that the resistance of the light emitting body 210 can be compensated after the resistance of the light body 210 changes with temperature.

The temperature compensation circuit 200 further includes a relay 234 and a switching circuit 235. The relay 234 is a conversion-typed relay including a coil, a static contact and two movable contacts. The first terminal 231 is the static contact of the relay 234, and the second terminal 232 and the third terminal 233 are the two movable contacts respectively. The temperature compensation circuit 230 further includes a voltage-regulator diode 238 connected in parallel to two terminals of the relay 234. It can be understood that in other embodiments, the voltage-regulator diode 238 can be omitted or other protection devices can be used.

The switching circuit 235 includes an input terminal 236 and an output terminal 237, and the output terminal 237 is electrically connected to the coil of the relay 234. When the first processing unit 203 outputs the logic level, the switching circuit 235 is turned on, and then a current flows through the wiring where the output terminal 237 and the coil are located, and the relay 234 is pulled in, the first terminal 231 is disconnected from the second terminal 232 and then electrically connected to the third terminal 233, and the light emitting body 210 is grounded through the thermistor R3. When the first processing unit 203 does not output the logic level, the switching circuit 235 is turned off, no current flows through the wiring where the output terminal 237 and the coil are located, the relay 234 is released, the first terminal 231 is disconnected from the third terminal 233 and then electrically connected to the second terminal 232, and the light emitting body 210 is grounded through the current limiting resistor R2.

In an embodiment, the switching circuit 235 includes a triode, a base of the triode is electrically connected to the input terminal 236, and a collector of the triode is the output terminal 237. In an embodiment, an emitter of the triode is the output terminal 237.

As shown in FIG. 3, the detecting device 200 further includes a temperature sensing device 209, and the temperature sensing device 209 is configured to sense the external ambient temperature and to transmit a temperature signal corresponding to the temperature of the external environment to the first processing unit 203. It can be understood that, in other embodiments, the first processing unit 203 includes a temperature sensing unit, so that the temperature sensing device 209 is omitted.

The detecting and control unit 207 is configured to receive the detection light periodically emitted by the reflection unit 205 and calculate the number of times of received detection light so as to determine the rotational speed of the color wheel 103. The detecting and control unit 207 includes a photosensitive triode Q, a comparator circuit 273, and a second processing unit 275. The photosensitive triode Q is configured to convert the periodically received detection light into a corresponding electrical pulse signal. The comparator circuit 273 is electrically connected to the photosensitive triode Q and configured to compare the electrical pulse signal with a preset voltage value and output a comparison result. The second processing unit 275 counts the electrical pulses according to the comparison result.

Specifically, a collector B of the photosensitive triode Q is electrically connected to a power supply VCC through the current limiting resistor, an emitter of the photosensitive triode Q is grounded. When no detection light is irradiated to the reflection unit 205, the photosensitive triode Q is turned off, and a voltage at the collector B is an output voltage of the power supply VCC. When the reflection unit 205 on the color wheel 103 rotates to a preset position, the detection light emitted by the light emitting body 210 is irradiated to the reflection unit 205, the reflection unit 205 reflects the detection light to the photosensitive triode Q, the photosensitive triode Q is turned on, and the voltage at the collector B is close to 0 V.

The collector B of the photosensitive triode Q is electrically connected to the input terminal of the comparator circuit 273. The comparator circuit 273 is composed of a comparator and a passive component, a non-inverting input terminal C of the comparator is electrically connected to the power supply VCC through a voltage dividing circuit, and an inverting input terminal of the comparator is electrically connected to the collector B. The voltage dividing circuit divides the voltage provided by the power supply VCC and obtains the preset voltage input to the non-inverting input terminal C, the comparator compares the voltage at the collector B with the preset voltage, if the voltage at the collector B is smaller than the preset voltage, the comparator outputs a high level, and if the voltage at the collector B is greater than the preset voltage, the comparator outputs a low level.

In an embodiment of the present disclosure, the first processing unit 203 can be a microprocessor, and the second processing unit 275 can be a main processing chip of the projection device. In an embodiment, the first processing unit 203 and the second processing unit 275 can be the same processing chip. It can be understood that the first processing unit 203 and the second processing unit 275 each can be a central processing unit (CPU), other general-purpose processor, a digital signal processor (DSP), an application specific integrated circuit (ASIC), a field-programmable gate array (FPGA) or other programmable logic devices, discrete gates or transistor logic elements, discrete hardware components, etc. The general-purpose processor can be a microprocessor or the processor can also be any conventional processor or the like.

Figure 5:
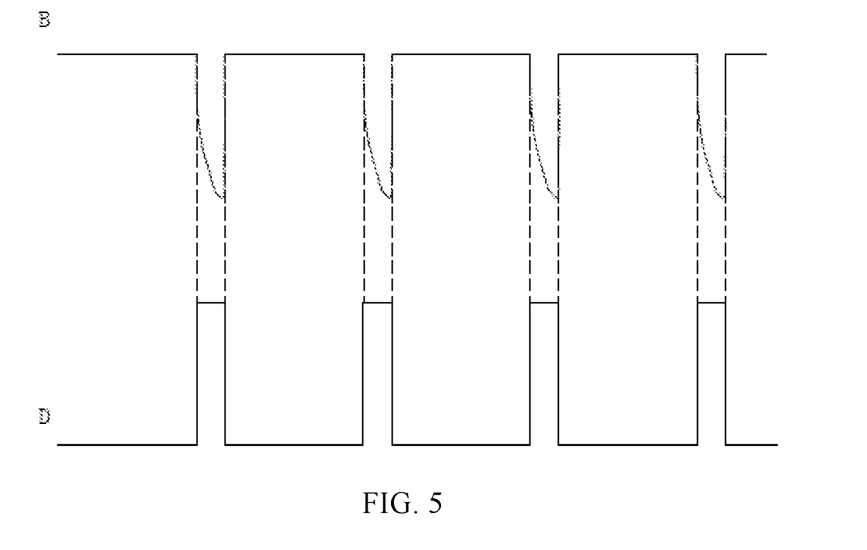
FIG. 5 is a schematic diagram showing output waveforms of a collector B and an output terminal D of a comparator of a detecting and control unit.

In an embodiment, the power supply VCC outputs a voltage of 3.3V, and it simultaneously supplies power to the photosensitive triode Q, the voltage dividing circuit, and the comparator. When the photosensitive triode Q is turned off, the collector B outputs 3.3V, the voltage at the non-inverting input terminal C is smaller than the voltage at the collector B, and the voltage output by the comparator is 0. When the photosensitive triode Q is turned on, the output voltage of the collector B is between 0 V and 0.5 V, the voltage at the non-inverting input terminal C is greater than the voltage at the collector B, and the voltage output by the comparator is 3.3V. As shown in FIG. 5, it is a schematic diagram of output waveforms of the collector B and the output terminal D of the comparator. As the color wheel 103 periodically moves, the comparator outputs an electric signal corresponding to the electric pulse signal output from the collector electrode B and corresponding to a rotation period of the color wheel 103. In an embodiment, the inverting input terminal of the comparator is electrically connected to the power supply VCC through the voltage dividing circuit, and the non-inverting input terminal C of the comparator is electrically connected to the collector B.

Figure 6:
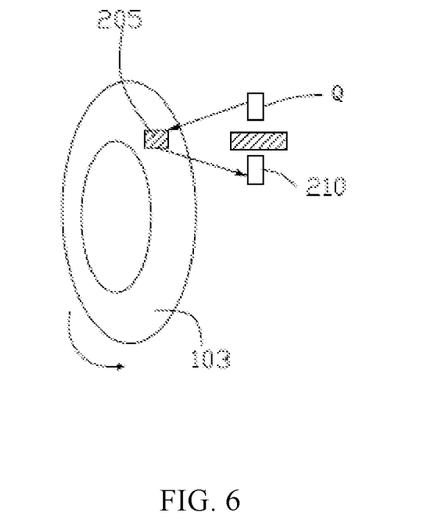
FIG. 6 is a schematic diagram of a color wheel shown in FIG. 1.

Referring to FIG. 6, which is a schematic diagram of the color wheel 103 shown in FIG. 1. The reflection unit 205 is arranged on the movable color wheel 103, the reflection unit 205 periodically comes into the optical path where the detection light emitted by the light emitting body 210 is located under the driving of the color wheel 103, and the reflection unit 205 is configured to reflect the detection light. It can be understood that the reflection unit 205 can be a mirror, or a reflecting film or a reflecting surface arranged on the surface of the color wheel 103. A light blocking element is provided between the light emitting body 210 and the detecting and control unit 207, and further, the light blocking element is arranged between the light emitting body 210 and the photosensitive triode Q, to avoid that the detection light emitted by the light emitting body 210 is irradiated to the photosensitive triode Q without being reflected by the reflection unit 205.

Figure 7:
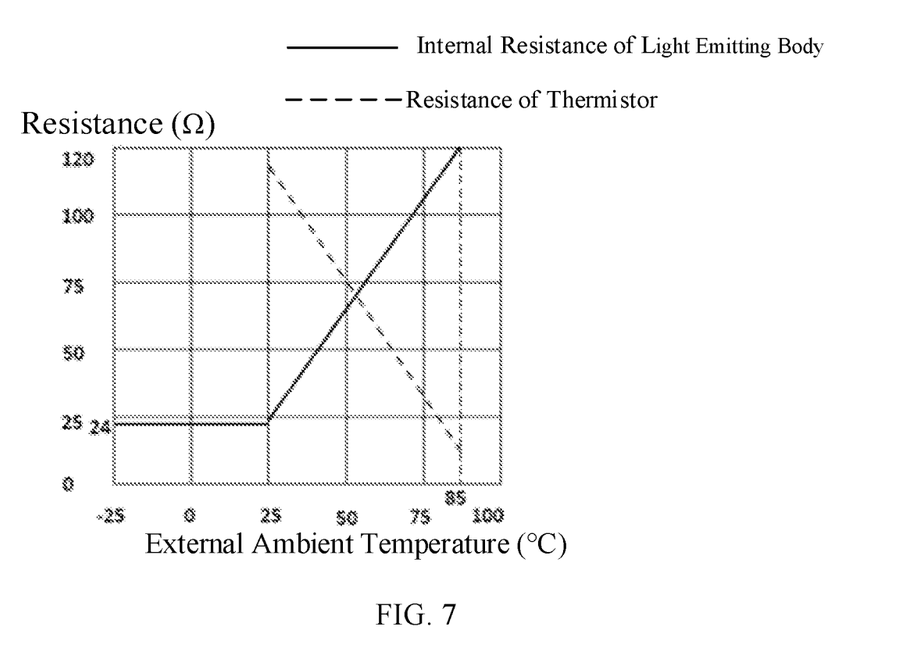
FIG. 7 shows variation curves of internal resistance of a light emitting body and resistance of a thermistor with an external ambient temperature.

Referring to FIG. 7 in conjunction with FIG. 4, FIG. 7 shows variation curves of the internal resistance of the light emitting body 210 and the resistance of the thermistor with the external ambient temperature. In the detecting device 200, a driving voltage of a branch where the light emitting body 210 is located is increased, so that the light emitting body 210 can operate normally when the light emitting body 210 is grounded through the current limiting resistor R2. In this embodiment, when the driving voltage of the branch where the light emitting body 210 is located is 1.4 V and the external ambient temperature is lower than 25° C., the internal resistance of the light emitting body 210 is 24Ω, the driving current is 50 mA, and the current limiting resistance R2 is 4.0. When the external ambient temperature is lower than 25° C., according to the variation curve of the internal resistance of the light emitting body 210 shown in FIG. 7 with the temperature, a function relationship between the internal resistance of the light emitting body 210 and the external ambient temperature, and a relationship between the resistance of the thermistor R3 and the external ambient temperature can be obtained. Specifically, the temperature coefficient of internal resistance of the light emitting body 210 is 1.6, so the negative temperature coefficient of the thermistor R3 is −1.6. After experiments, it is found that when the driving current of the light emitting body 210 is 20 mA, the voltage value at the collector B is just smaller than the voltage 1.65 V that is generated by the power supply VCC at the non-inverting input terminal C after being divided, and in this case, the internal resistance inside the light emitting body 210 is 70Ω. It is not difficult to conclude that the resistance of the thermistor R3 at 25° C. is 116Ω. Therefore, parameters of the thermistor R3 are determined. It can be understood that the thermistor R3 can be flexibly selected according to needs.

Figure 8:
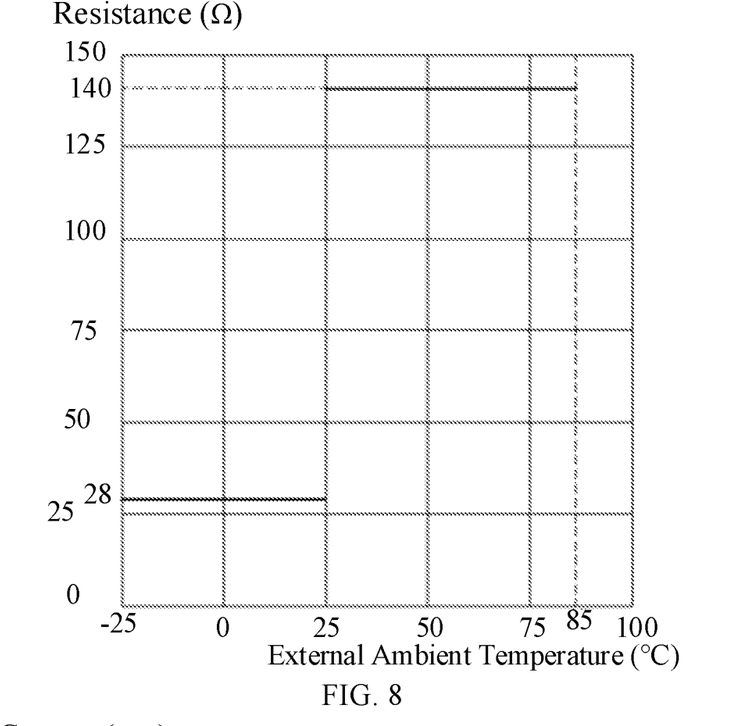
FIG. 8 shows a variation curve of resistance of a branch where a light emitting body is located with an external ambient temperature.
Figure 9:
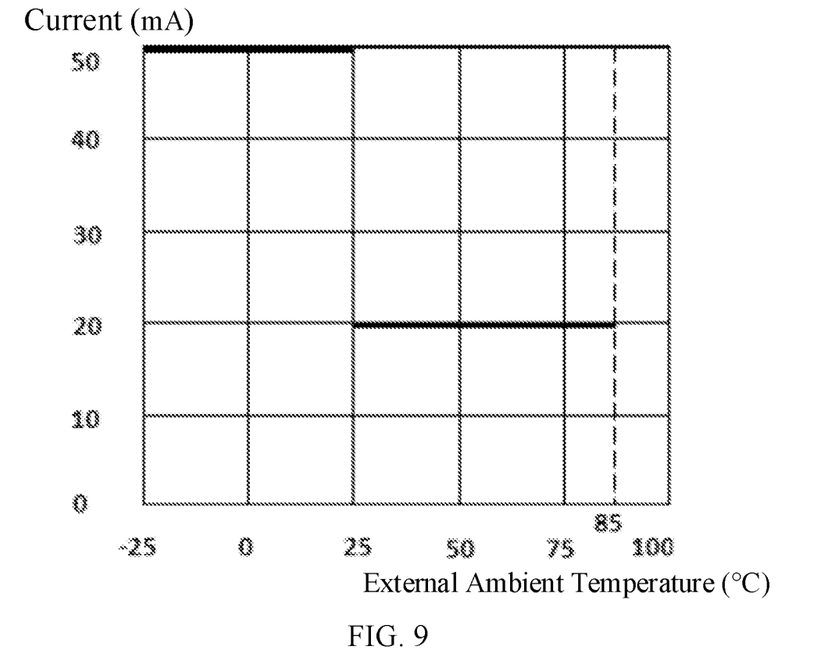
FIG. 9 shows a variation curve of a driving current of a light emitting body with an external ambient temperature.

Referring to FIGS. 8-9, FIG. 8 is the variation curve of the resistance of the branch where the light emitting body 210 is located with the external ambient temperature, and FIG. 9 shows the variation curve of the driving current of the light emitting body 210 with the external ambient temperature. After correction by the temperature compensation circuit 230, when the external ambient temperature is lower than the preset temperature, the resistance of the branch where the light emitting body 210 is located maintains 28Ω, and the dividing current is 50 mA. When the external ambient temperature is higher than the preset temperature, the resistance of the branch where the light emitting body 210 is located maintains 140Ω, the driving current is 20 mA, and the driving current of the light emitting body 210 is always greater than 20 mA, thereby ensuring that the detection light emitted by the light emitting body 210 can always be detected by the detecting and control unit 207 after being reflected by the reflection unit 205, and the measurement accuracy of the detecting device 200 does not decrease with changes of the external ambient temperature.

It can be understood that since the resistance and the driving current of the branch where the light emitting body 210 is located fluctuate within a certain range, when the external ambient temperature is lower than the preset temperature, the preset current range is a first current range, such as 45 mA to 55 mA. When the external ambient temperature is greater than the preset temperature, the preset current range is a second current range, for example, 20 mA to 30 mA. The first current range is different from the second current range. In other embodiments, the first current range and the second current range can be set as required.

Figure 10:
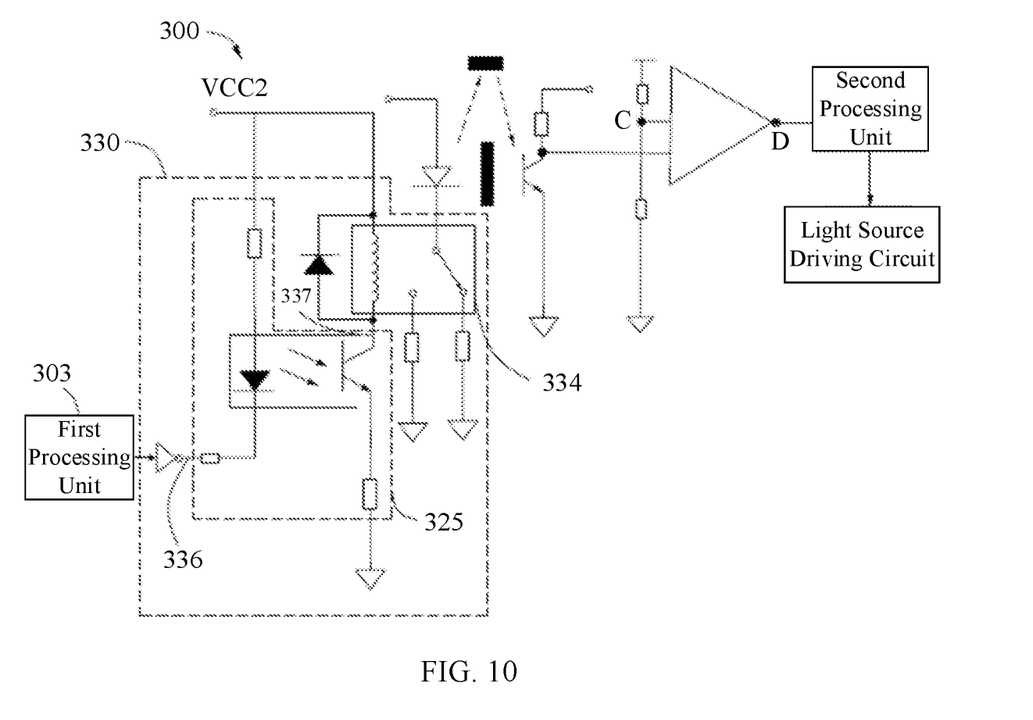
FIG. 10 is a schematic diagram of the detecting device shown in FIG. 1 according to another embodiment.

Referring to FIG. 10, which is a schematic diagram of another embodiment of a detecting device 300 for detecting a rotation speed of a color wheel shown in FIG. 1. In this embodiment, the switching circuit 325 includes a photocoupler, and the photocoupler includes a light-emitting diode and a photosensitive triode, one electrode of the light-emitting diode is electrically connected to the input terminal 336, and one electrode of the photosensitive triode is the output terminal 337. Specifically, a cathode of the light-emitting diode is electrically connected to the input terminal 336, and a collector of the photosensitive triode is the output terminal 337 and electrically connected to the coil of the relay 334. The temperature compensation circuit 330 further includes an inverter connected between the first processing unit 303 and the input terminal 336, and an anode of the light-emitting diode is electrically connected to a power supply VCC2.

When the external ambient temperature is higher than 25° C., the first processing unit 303 outputs a high level, and it is converted to a low level after passing through the inverter, the light-emitting diode of the photocoupler emits light, the photocoupler is turned on, and the relay 334 is pulled in. When the external ambient temperature is lower than 25° C., the first processing unit 303 outputs a low level, and it is converted to a high level after passing through the inverter, the light-emitting diode of the photocoupler does not emit light, the photocoupler is turned off, and the relay 334 is released.

It should be noted that within the scope of the spirit or basic features of the present disclosure, various specific solutions applicable to the first embodiment can also be correspondingly applied to the second embodiment, which will not be repeated herein to save space and avoid repetition.

For those skilled in the art, it is obvious that the present disclosure is not limited to the details of the foregoing exemplary embodiments, moreover, the present disclosure can be implemented in other specific forms without departing from the spirit or the basic characteristics of the present disclosure. Therefore, no matter from which point of view, the embodiments should be regarded as exemplary and non-limiting, the scope of the present disclosure is defined by the appended claims rather than the above description, therefore, it is intended that all changes falling within the meaning and scope of equivalent elements of the claims are included in the present disclosure. Any reference signs in the claims should not be regarded as limiting the claims involved. In addition, it is obvious that the word "including" does not exclude other units or steps, and the singular does not exclude the plural. Multiple devices stated in the device claims can also be implemented by the same device or system through software or hardware. Words such as first and second are used to denote names but do not denote any specific order.

Finally, it should be noted that the above embodiments are only used to illustrate the technical solutions of the present disclosure and not to limit it. Although the present disclosure has been described in detail with reference to the preferred embodiments, those of ordinary skill in the art should understand that the technical solution of the present disclosure can be modified or equivalently replaced without departing from the spirit and scope of the technical solution of the present disclosure.

What is claimed is:

1. A detecting device for detecting a rotation speed of a color wheel, comprising:
a first processing unit configured to compare an external ambient temperature with a preset temperature and to output a logic level when the external ambient temperature is higher than the preset temperature;
a light-emitting unit comprising a light emitting body and a temperature compensation circuit, wherein the light emitting body is configured to emit detection light, and the temperature compensation circuit comprises an input terminal electrically connected to the first processing unit and a first terminal electrically connected to the light emitting body, and wherein the temperature compensation circuit adjusts resistance of a wiring where the light emitting body is located based on the logic level and the external ambient temperature in such a manner that a driving current of the light emitting body is within a preset current range;
a reflection unit configured to reflect the detection light and arranged on the color wheel that is movable, wherein the reflection unit periodically comes into an optical path of the detection light under driving of the color wheel; and
a detecting and control unit configured to receive the detection light periodically exiting from the reflection unit and calculate a number of incidence times of the detection light so as to determine a rotational speed of the color wheel.

2. The detecting device according to claim 1, wherein the temperature compensation circuit further comprises a second terminal and a third terminal, wherein:
resistance between the second terminal and reference ground is a fixed value;
resistance between the third terminal and the reference ground changes with the external ambient temperature;
if the first processing unit does not output the logic level, the first terminal is electrically connected to the second terminal, and
if the first processing unit outputs the logic level, the first terminal is electrically connected to the third terminal.

3. The detecting device according to claim 2, wherein:
when the external ambient temperature is lower than the preset temperature, the preset current range is a first current range;
when the external ambient temperature is higher than the preset temperature, the preset current range is a second current range different from the first current range.

4. The detecting device according to claim 2, wherein the temperature compensation circuit further comprises:
a current limiting resistor electrically connected between the second terminal and the reference ground; and
a thermistor electrically connected between the third terminal and the reference ground.

5. The detecting device according to claim 4, wherein resistance of the light emitting body increases as the external ambient temperature increases, and the thermistor is a thermistor with a negative temperature coefficient.

6. The detecting device according to claim 2, wherein the temperature compensation circuit further comprises:
a relay comprising a static contact and two movable contacts, wherein the first terminal is the static contact of the relay, and the second terminal and the third terminal are the two movable contacts, respectively; and
a switching circuit comprising an output terminal and the input terminal, wherein the output terminal is electrically connected to a coil of the relay,
wherein when the first processing unit outputs the logic level, the switching circuit is turned on and a current flows through a wiring where the output terminal and the coil are located.

7. The detecting device according to claim 6, wherein the switching circuit further comprises a voltage-regulator diode connected in parallel to two terminals of the relay.

8. The detecting device according to claim 6, wherein the switching circuit comprises a triode, wherein a base of the triode is electrically connected to the input terminal, and a collector or an emitter of the triode is the output terminal.

9. The detecting device according to claim 6, wherein the switching circuit comprises a photocoupler, wherein the photocoupler comprises an inverter, a light-emitting diode, and a photosensitive triode; and
wherein the inverter is connected between the first processing unit and the input terminal, an electrode of the light-emitting diode is electrically connected to the input terminal, and an electrode of the photosensitive triode is the output terminal.

10. The detecting device according to claim 1, wherein the reflection unit is a mirror, or a reflecting film or a reflecting surface provided on a surface of the color wheel.

11. The detecting device according to claim 1, further comprising:
a temperature sensing device configured to sense the external ambient temperature and transmit a temperature signal corresponding to the external ambient temperature to the first processing unit.

12. The detecting device according to claim 1, wherein the detecting and control unit comprises:
a photosensitive triode configured to convert the periodically received detection light into an electrical pulse signal;
a comparator circuit electrically connected to the photosensitive triode and configured to compare the electrical pulse signal with a preset voltage value and output a comparison result; and
a second processing unit configured to count a number of the electrical pulse based on the comparison result.

13. A light source system, comprising:
an excitation light source configured to emit excitation light;
a color wheel configured to generate fluorescence of at least one color under irradiation of the excitation light;
a light source driving circuit electrically connected to the excitation light source; and
a detecting device for detecting a rotation speed of the color wheel, wherein the detecting device comprises:
a first processing unit configured to compare an external ambient temperature with a preset temperature and to output a logic level when the external ambient temperature is higher than the preset temperature;
a light-emitting unit comprising a light emitting body and a temperature compensation circuit, wherein the light emitting body is configured to emit detection light, and the temperature compensation circuit comprises an input terminal electrically connected to the first processing unit and a first terminal electrically connected to the light emitting body, and wherein the temperature compensation circuit adjusts resistance of a wiring where the light emitting body is located based on the logic level and the external ambient temperature is such a manner that a driving current of the light emitting body is within a preset current range;
a reflection unit configured to reflect the detection light and arranged on the color wheel that is movable, wherein the reflection unit periodically comes into an optical path of the detection light under driving of the color wheel; and
a detecting and control unite configured to receive the detection light periodically existing from the reflection unit and calculate number of incidence times of the detection light so as to determine a rotational speed of the color wheel,
wherein the detecting and control unit is further configured to output a control signal to the light source driving circuit based on the rotational speed of the color wheel, and the light source driving circuit provides a driving current to the excitation light source based on the control signal.

14. A projection device, comprising the light source system according to claim 13.

15. The light source system according to claim 13, wherein the temperature compensation circuit further comprises a second terminal and a third terminal, wherein:
resistance between the second terminal and reference ground is a fixed value;
resistance between the third terminal and the reference ground changes with the external ambient temperature;
if the first processing unit does not output the logic level, the first terminal is electrically connected to the second terminal, and
if the first processing unit outputs the logic level, the first terminal is electrically connected to the third terminal.

16. The light source system according to claim 15, wherein:
when the external ambient temperature is lower than the preset temperature, the preset current range is a first current range;
when the external ambient temperature is higher than the preset temperature, the preset current range is a second current range different from the first current range.

17. The light source system according to claim 15, wherein the temperature compensation circuit further comprises:
a current limiting resistor electrically connected between the second terminal and the reference ground; and
a thermistor electrically connected between the third terminal and the reference ground.

18. The light source system according to claim 17, wherein resistance of the light emitting body increases as the external ambient temperature increases, and the thermistor is a thermistor with a negative temperature coefficient.

19. The light source system according to claim 15, wherein the temperature compensation circuit further comprises:
- a relay comprising a static contact and two movable contacts, wherein the first terminal is the static contact of the relay, and the second terminal and the third terminal are the two movable contacts, respectively; and
- a switching circuit comprising an output terminal and the input terminal, wherein the output terminal is electrically connected to a coil of the relay,
- wherein when the first processing unit outputs the logic level, the switching circuit is turned on and a current flows through a wiring where the output terminal and the coil are located.

20. The light source system according to claim 19, wherein the switching circuit further comprises a voltage-regulator diode connected in parallel to two terminals of the relay.

* * * * *